US011081892B2

(12) United States Patent
Sibeud et al.

(10) Patent No.: US 11,081,892 B2
(45) Date of Patent: Aug. 3, 2021

(54) ELECTRIC ENERGY TRANSMISSION CIRCUIT

(71) Applicant: Commissariat à l'Énergie Atomique et aux Énergies Alternatives, Paris (FR)

(72) Inventors: Loïc Sibeud, Grenoble (FR); Romain Grezaud, Sassenage (FR)

(73) Assignees: Commissariat à l'Énergie Atomique et aux Énergies Alternatives, Paris (FR); SAFRAN, Paris (FR)

(*) Notice: Subject to any disclaimer, the term of this patent is extended or adjusted under 35 U.S.C. 154(b) by 273 days.

(21) Appl. No.: 16/329,942

(22) PCT Filed: Sep. 6, 2017

(86) PCT No.: PCT/FR2017/052364
§ 371 (c)(1),
(2) Date: Mar. 1, 2019

(87) PCT Pub. No.: WO2018/046848
PCT Pub. Date: Mar. 15, 2018

(65) Prior Publication Data
US 2021/0057918 A1    Feb. 25, 2021

(30) Foreign Application Priority Data

Sep. 7, 2016  (FR) ..................... 1658299

(51) Int. Cl.
*H02J 4/00* (2006.01)
*H02J 3/38* (2006.01)

(52) U.S. Cl.
CPC ............... *H02J 4/00* (2013.01); *H02J 3/381* (2013.01); *H02J 2300/22* (2020.01); *H02J 2300/28* (2020.01)

(58) Field of Classification Search
None
See application file for complete search history.

(56) References Cited

U.S. PATENT DOCUMENTS 5,536,976 A    7/1996  Churchill
6,211,681 B1*  4/2001  Kagawa ............... B60L 3/0046
                                                324/426

(Continued)

OTHER PUBLICATIONS

International Preliminary Report on Patentability for International Application No. PCT/FR2017/052364, dated Mar. 12, 2019.

(Continued)

*Primary Examiner* — Rexford N Barnie
*Assistant Examiner* — Terrence R Willoughby
(74) *Attorney, Agent, or Firm* — Wolf, Greenfield & Sacks, P.C.

(57) ABSTRACT

An electronic or electromechanical system including at least one electrical energy source, a first circuit capable of operating in at least two operating modes, one of which corresponds to the stopping of the application circuit, and a circuit for transmitting the electrical energy from the energy source to the application circuit, the transmission circuit being further capable of determining a first value of the maximum instantaneous electric power capable of being supplied by the energy source, of determining a second value of the instantaneous electric power consumed by the application circuit in at least one of the operating modes, and of storing the first and second values or of selecting the operating mode of the application circuit from among said at least two operating modes based on the first and second values.

9 Claims, 6 Drawing Sheets

(56) References Cited

U.S. PATENT DOCUMENTS

| | | |
|---|---|---|
| 2002/0046354 A1 | 4/2002 | Ostrom et al. |
| 2013/0007515 A1 | 1/2013 | Shaw et al. |
| 2013/0147274 A1* | 6/2013 | Ku .................... H02J 3/383 |
| | | 307/31 |
| 2015/0153409 A1 | 6/2015 | Zhu et al. |

OTHER PUBLICATIONS

International Search Report and Written Opinion for International Application No. PCT/FR2017/052364, dated Nov. 21, 2017.

Christmann et al., Energy Harvesting and Power Management for Autonomous Sensor Nodes. DAC '12 Proceedings of the 49th Annual Design Automation Conference, San Francisco, CA. Jun. 2012 3-7:1049-1054.

* cited by examiner

ELECTRIC ENERGY TRANSMISSION CIRCUIT

This application is a national stage filing under 35 U.S.C. § 371 of International Patent Application Serial No. PCT/FR2017/052364, filed Sep. 6, 2017, which claims priority to French patent application FR16/58299, filed Sep. 7, 2016. Both of these applications are incorporated herein by reference in their entireties.

BACKGROUND

The present application concerns a circuit of transmission of electrical energy between an electrical energy source and an application circuit consuming said electrical energy.

DISCUSSION OF THE RELATED ART

An autonomous electronic or electromechanical system comprises an electrical energy source and at least one application circuit powered from the electrical energy supplied by the energy source. The system generally comprises an electrical energy transmission system which receives the electrical energy supplied by the electrical energy source and supplies this electrical energy in a form, particularly a voltage level, which is adapted for the power supply of the application circuit.

For certain applications, it is desirable for the electrical energy source to correspond to an ambient energy collection device, capable of extracting and of converting into electrical energy one or a plurality of forms of energy present in the environment, for example, thermal, vibratory, solar, wind, or radio frequency energy. Since the instantaneous electrical energy supplied by such an electrical energy source may be non constant over time, it is known for the transmission circuit to comprise a supercapacitor or a battery of rechargeable accumulators to temporarily store the electrical energy supplied by the energy source and enable to keep on powering the application circuit even when the instantaneous electric power consumed by the application circuit is lower than the instantaneous electric power supplied by the energy source.

However, the use of a supercapacitor or of a battery of accumulators has disadvantages. Indeed, the part of the battery of accumulators/of the supercapacitor in the manufacturing cost and in the weight of the electrical or electromechanical system may be high. Further, the maximum operating temperature of the electrical or electromechanical system is generally limited by the maximum operating temperature of the battery of accumulators/of the supercapacitor. Further, the lifetime and the reliability of the electrical or electromechanical system are generally limited by those of the battery of accumulators/of the supercapacitor.

SUMMARY

An object of an embodiment is to overcome all or part of the disadvantages of the previously-described autonomous electrical or electromechanical systems.

Another object of an embodiment is for the electrical or electromechanical system to comprise no battery of accumulators or supercapacitor.

Another object of an embodiment is to decrease the manufacturing cost of the electrical or electromechanical system.

Another object of an embodiment is to decrease the weight of the electrical or electromechanical system.

Another object of an embodiment is for the maximum operating temperature of the electrical or electromechanical system to be greater than the maximum temperatures generally authorized by batteries of accumulator/supercapacitors available for sale.

Another object of an embodiment is to increase the lifetime of the electrical or electromechanical system.

Another object of an embodiment is to increase the reliability of the electrical or electromechanical system.

Thus, an embodiment provides an electronic or electromechanical system comprising at least one electrical energy source, a first circuit capable of operating in at least two operating modes, one of which corresponds to the stopping of the application circuit, and a circuit for transmitting the electrical energy from the energy source to the application circuit, the transmission circuit being further capable of determining a first value of the maximum instantaneous electric power capable of being supplied by the energy source, of determining a second value of the instantaneous electric power consumed by the application circuit in at least one of the operating modes, and of storing the first and second values or of selecting the operating mode of the application circuit from among said at least two operating modes based on the first and second values.

According to an embodiment, the transmission circuit comprises a voltage regulation circuit capable of receiving a first voltage supplied by the energy source, or by a power conversion circuit interposed between the energy source and the transmission circuit, and capable of supplying a second voltage regulated at a reference voltage powering the first circuit.

According to an embodiment, the voltage regulation circuit is a voltage regulator having a low voltage drop.

According to an embodiment, the application circuit is capable of operating according to a succession of operating modes, the electric power consumption of the application circuit in one of the operating modes of said succession being greater than the electric power consumption of the application circuit in the next operating mode of said succession, the transmission circuit being further capable of controlling the operation of the application circuit in the previous operating mode in said succession when the first value is smaller than the second value.

According to an embodiment, the transmission circuit comprises a current sink circuit capable of drawing a first current of increasing intensity.

According to an embodiment, the energy source is coupled to the transmission circuit over a first transmission line. The transmission circuit is coupled to the application circuit by a second transmission line. The current sink circuit is capable of drawing the first current of increasing intensity from the first transmission line and the transmission circuit comprises a circuit of determination of the maximum intensity of the first current for which the second voltage is no longer regulated.

According to an embodiment, the transmission circuit is capable of determining the first value as being the product of the reference voltage by the maximum intensity.

According to an embodiment, the application circuit is capable of receiving a second current and the transmission circuit comprises a copying circuit capable of supplying a third current equal to the second current multiplied by a copying factor.

According to an embodiment, the transmission circuit comprises a circuit capable of supplying a fourth current equal to the difference between the third current and the first current and a circuit of detection of an inversion of the direction of the fourth current.

According to an embodiment, the transmission circuit is capable of determining the second value as being the product of the copying factor, of the reference voltage, and of the intensity of the first current for which the direction of the fourth current is inverted.

According to an embodiment, the electrical energy source is a device of conversion into electrical energy of energy selected from the group comprising thermal energy, vibratory energy, solar energy, wind energy, and radio frequency energy.

According to an embodiment, the system comprises no energy storage device having a capacitance greater than 100 µF.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
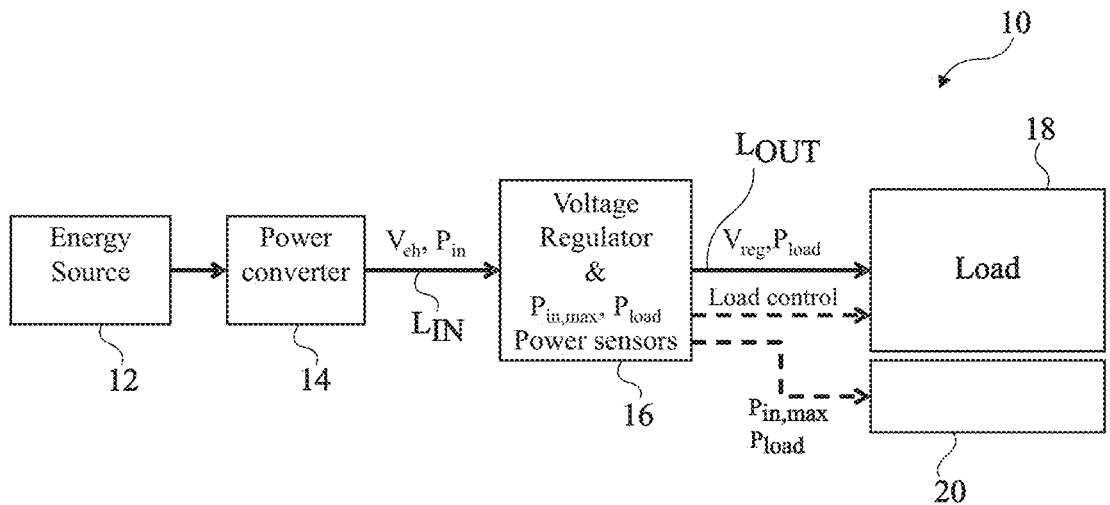
FIGS. 1 and 2 partially and schematically show embodiments of an autonomous electronic or electromechanical system.

The same elements have been designated with the same reference numerals in the different drawings. For clarity, only those elements which are useful to the understanding of the described embodiments have been shown and are detailed. In particular, electrical energy sources capable of extracting and of converting into electrical energy one or a plurality of forms of energy present in the environment are well known by those skilled in the art and are not described in detail hereafter. The terms "approximately", "substantially", and "in the order of" are used herein to designate a tolerance of plus or minus 10%, preferably of plus or minus 5%, of the value in question.

In the following description, the source and the drain of a MOS transistor are called "power terminals" of the MOS transistor. Further, a signal which alternates between a first constant state, for example, a low state, noted "0", and a second constant state, for example, a high state, noted "1", is called a "binary signal". The high and low states of different binary signals of a same electronic circuit may be different. In particular, the binary signals may correspond to voltages or to currents which may not be perfectly constant in the high or low state. Further, in the present description, the term "connected" is used to designate a direct electric connection, with no intermediate electronic component, for example, by means of a conductive track, and the term "coupled" or the term "linked" will be used to designate either a direct electric connection (then meaning "connected") or a connection via one or a plurality of intermediate components (resistor, capacitor, etc.).

In the following drawings comprising block diagrams, a full line connecting two blocks corresponds to a line of transmission of an electric signal with the passing of electric power and a dotted line connecting two blocks corresponds to a line of an electric signal with no transmission of electric power. A transmission line may comprise one, two, or more than two conductive cables or conductive tracks.

FIG. 1 shows an embodiment of an electronic or electromechanical system 10. System 10 comprises an electrical energy source 12 (Energy Source) which is coupled, possibly via a power conversion circuit 14 (Power Converter), by a transmission line $L_{IN}$ to an electrical energy transmission circuit 16 (Voltage Regulator & $P_{in,max}$, $P_{load}$ Power sensors) which, in the present embodiment, corresponds to a voltage regulation circuit.

Power conversion circuit 14, or directly electrical energy source 12 when power conversion circuit 14 is not present, supplies over transmission line $L_{IN}$ an electric voltage $V_{eh}$ at an instantaneous electric power $P_{in}$. Voltage $V_{eh}$ is not regulated and is capable of varying over time.

Voltage regulation circuit 16 is coupled by a transmission line $L_{OUT}$ to an application circuit 18 (Load). Voltage regulation circuit 16 supplies over line $L_{OUT}$ a voltage $V_{reg}$ at an instantaneous electric power $P_{load}$. In operation, voltage $V_{reg}$ is regulated by voltage regulation circuit 16, that is, it is substantially equal to a constant reference value $V_{ref}$. It should be noted that in operation, voltage $V_{eh}$ should be greater than voltage $V_{reg}$.

Electrical energy source 12 may correspond to an ambient energy collection device, capable of extracting and of converting into electrical energy one or a plurality of energy sources present in the environment. As an example, electrical energy source 12 is a device of conversion into electrical energy of thermal energy, of vibratory energy, of solar energy, of wind energy, and/or of radio frequency energy. According to an embodiment, the power $P_{in}$ supplied by energy source 12 varies during the performing of a task by application circuit 18. As an example, the longest duration of the tasks capable of being performed by application circuit 18, for example, in the order of one second, is shorter than the time period during which power $P_{in}$ supplied by energy source 12 may vary by 10%.

Application circuit 18 for example comprises at least one processor, one sensor, and one communication unit. The processor is capable of executing instructions of a computer program stored in a memory. As a variation, the processor is replaced with at least one dedicated electronic circuit. Electronic or electromechanical system 10 does not comprise, between energy source 12 and application circuit 18, an energy storage device having a capacitance greater than 100 µF. Electronic or electromechanical system 10 does not comprise, between energy source 12 and application circuit 18, a supercapacitor, an electric accumulator, or a battery of electrical accumulators capable of maintaining voltage $V_{eh}$ above voltage $V_{reg}$ when application circuit 18 carries out one or a plurality of tasks while instantaneous input power $P_{in}$ is not sufficient.

According to an embodiment, the output impedance of energy source 12 and/or of power conversion circuit 14, when present, is smaller than 10 megaOhms, preferably in the range from 10 Ohms to 100 kiloOmhs.

According to an embodiment, voltage regulation circuit 16 is capable of measuring both the available maximum instantaneous input power $P_{in,max}$ and the instantaneous power $P_{load}$ consumed by application circuit 18.

According to an embodiment, for the measurement of power $P_{in,max}$, regulation circuit 16 comprises an active current load which varies the current supplied by energy source 12 up to a value $I_{test,max}$ sufficient to lower voltage $V_{eh}$ down to voltage threshold $V_{reg}$. The maximum power $P_{in,max}$ available to power application circuit 18 then is $V_{reg}*I_{test,max}$.

According to an embodiment, for the measurement of power $P_{load}$, regulation circuit 16 copies the current supplied to application circuit 18.

Regulation circuit 16 may supply power values $P_{in,max}$ and $P_{load}$ to an external circuit 20. As an example, external circuit 20 may comprise a memory where values $P_{in,max}$ and $P_{load}$ are stored.

Advantageously, the maximum available power $P_{in,max}$ provides information as to the environment of application circuit 18, which may be unknown for certain applications, particularly when electrical energy source 12 corresponds to an energy recovery circuit.

Based on the measurements of powers $P_{in,max}$ and $P_{load}$, electronic or electromechanical system 10 may ensure the proper operation of application circuit 18 and optimize the use of the available power.

According to an embodiment, application circuit 18 may operate according to two operating modes only, one operating mode where application circuit 18 is stopped and one operating mode where application circuit 18 is running. According to another embodiment, application circuit 18 may be capable of operating according to more operating modes, including an operating mode in the stopped state, the electric power consumption of application circuit 18 varying from one operating mode to the other. As an example, in one operating mode, the processor of application circuit 18 may operate at a decreased frequency, which causes a decrease in the electric power consumption of application circuit 18. In another operating mode, all the calculation, measurement, and communication functions of application circuit 18 are active and operate with a maximum performance. The electric power consumption of application circuit 18 is then maximum.

Regulation circuit 16 or another circuit of electronic or electromechanical system 10 may transmit a control signal Load_control to application circuit 18 to control the operation of application circuit 18 according to one of the operating modes of application circuit 18. Preferably, regulation circuit 16 or another circuit of electronic or electromechanical circuit 10 transmits control signal Load_control to application circuit 18 to select an operating mode of application circuit 18 where the power $P_{load}$ consumed by application circuit 18 is lower than or equal to the maximum available power $P_{in,max}$.

Figure 2:
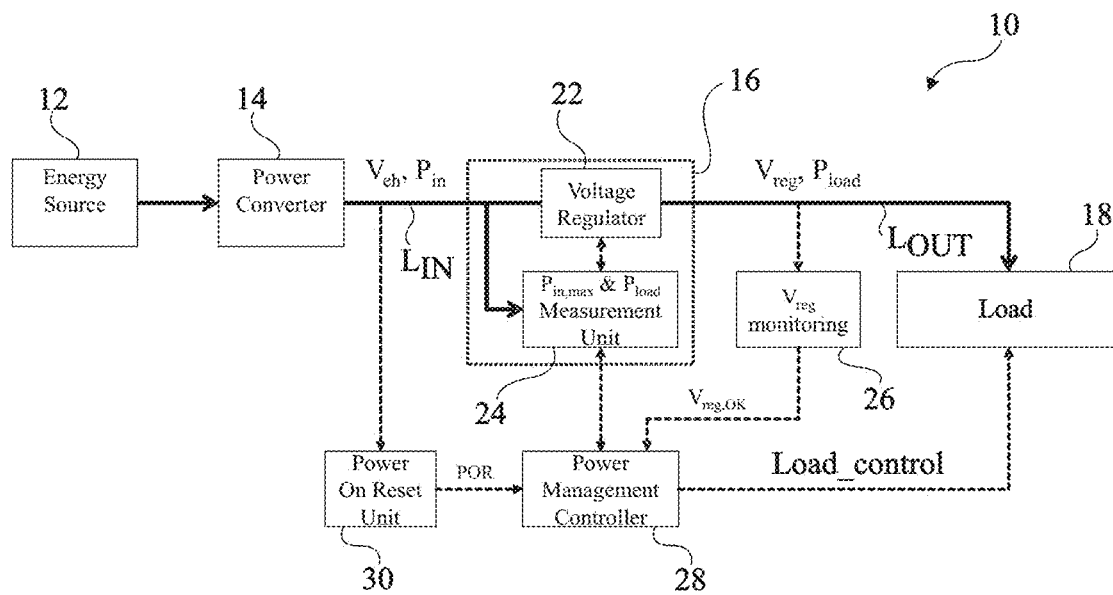

FIG. 2 shows a more detailed embodiment of system 10 of FIG. 1. In this embodiment, regulation circuit 16 comprises a voltage regulation unit 22 (Voltage Regulator) which receives voltage $V_{eh}$ and outputs voltage $V_{reg}$. Regulation circuit 16 further comprises a unit 24 ($P_{in,max}$ & $P_{load}$ Measurement Unit) for measuring maximum power $P_{in,max}$ and the power $P_{load}$ consumed by application circuit 18 which receives voltage $V_{eh}$ at power $P_{in}$ and which is coupled to unit 22.

System 10 further comprises a unit 26 ($V_{reg}$ monitoring) for monitoring voltage $V_{reg}$ which outputs a binary signal $V_{reg,OK}$ in a first state, for example, "1", when voltage $V_{reg}$ is at a level adapted to the proper operation of application circuit 18 and which outputs binary signal $V_{reg,OK}$ in a second state, for example, "0", when voltage $V_{reg}$ is not at a level adapted to the proper operation of application circuit 18, for example, when voltage $V_{reg}$ is smaller than a given fraction (between 70% and 95%) of reference value $V_{reg0}$.

System 10 further comprises a power management unit 28 (Power Management Controller) which is coupled to measurement units 24 and to monitoring unit 26 and which supplies control signal Load_control to application circuit 18.

System 10 further comprises a unit 30 (Power On Reset Unit) for controlling the powering-on of power management unit 28 and possibly of other elements forming electronic or electromechanical system 10. As an example, unit 30 receives voltage $V_{eh}$ and transmits a signal POR to unit 28. Unit 30 guarantees the powering-on of power management unit 28 in a predetermined state.

The power supply of the different components of system 10 may be performed from voltage $V_{reg}$.

Figure 3:
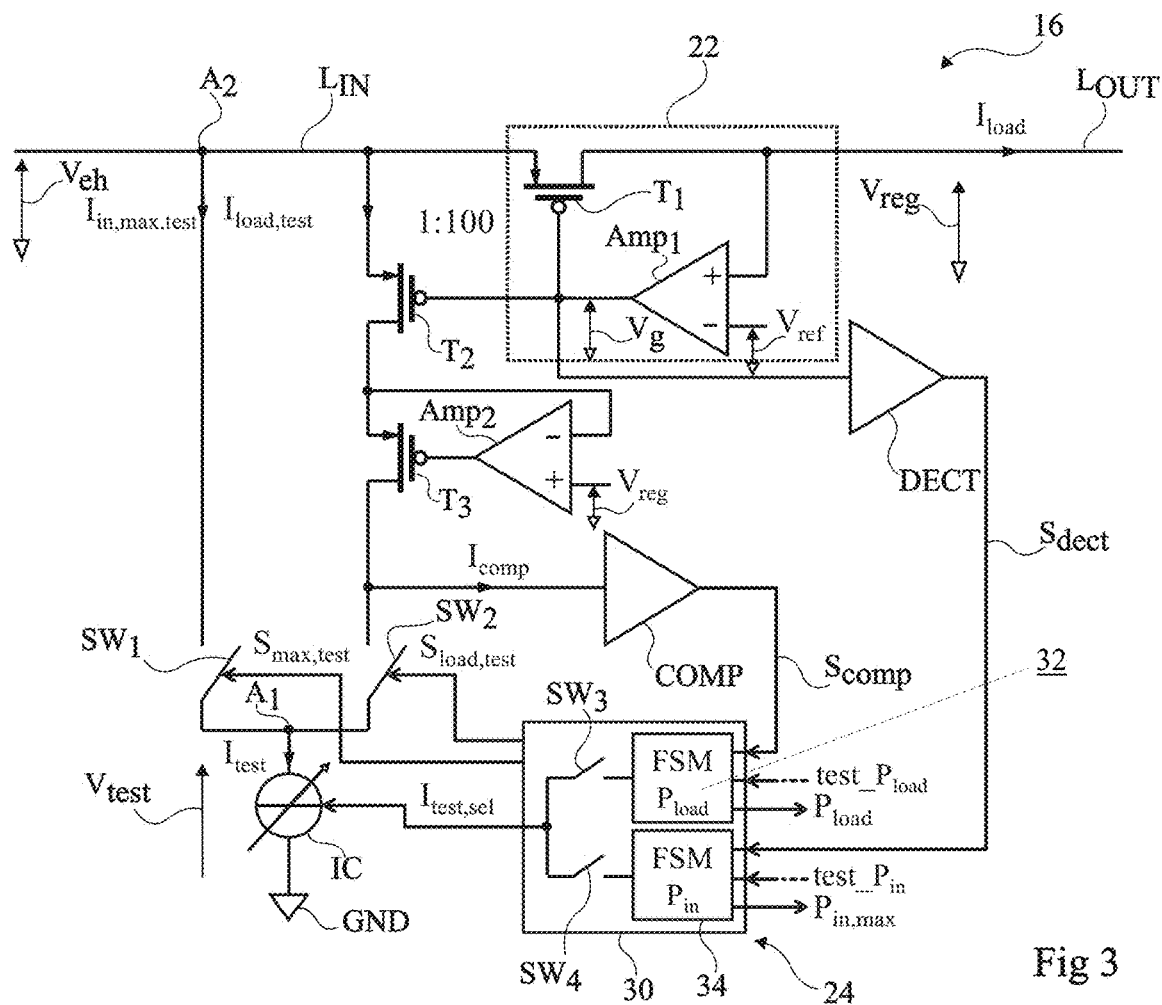
FIG. 3 shows an embodiment of the transmission circuit of the electronic or electromechanical system of FIG. 2.

FIG. 3 shows a more detailed embodiment of regulation circuit 16. In FIG. 3, voltages $V_{eh}$ and $V_{reg}$ are referenced with respect to a low reference potential. In the present embodiment, voltage regulation unit 22 is a voltage regulator having a low voltage drop or LDO regulator comprising a MOS transistor $T_1$, for example, having a P channel, and a differential amplifier $Amp_1$. The source of transistor $T_1$ is coupled by connection line $L_{IN}$ to power conversion circuit 14, or directly to source 12 when power conversion circuit 14 is not present, and receives voltage $V_{eh}$. The drain of transistor $T_1$ is coupled by connection line $L_{OUT}$ to application circuit 18 and supplies voltage $V_{reg}$. Transistor $T_1$ conducts a current $I_{load}$. The non-inverting input (+) of amplifier Amp receives voltage $V_{reg}$ and the inverting input (−) of amplifier $Amp_1$ receives a reference voltage $V_{ref}$. Amplifier $Amp_1$ supplies a voltage $V_g$ for controlling the gate of transistor $T_1$.

Regulation circuit 16 further comprises a controllable active load IC capable of drawing a current $I_{test}$ and having a terminal $A_1$ coupled via a switch $SW_1$ to a node $A_2$ of line $L_{IN}$ and having its other terminal coupled to a source of low reference potential GND, for example, the ground. Call $V_{test}$ the voltage across active load IC and $I_{in,max,test}$ the current flowing through switch $SW_1$.

Regulation circuit 16 further comprises a MOS transistor $T_2$, for example, with a P channel, having its source coupled to node $A_2$ and having its gate receiving voltage $V_g$. Transistor $T_2$ conducts a current $I_{load,test}$. The dimensions of transistors $T_1$ and $T_2$ are selected so that the ratio Coeff of current $I_{load,test}$ to current $I_{load}$ is greater than 10, preferably greater than 50, for example, approximately equal to 100. Regulation circuit 16 further comprises a MOS transistor $T_3$, for example, with a P channel, having its source coupled to the drain of transistor $T_2$ and having its drain coupled to node $A_1$ via a switch $SW_2$. Regulation circuit 16 further comprises a differential amplifier $Amp_2$. The inverting input (−) of amplifier $Amp_2$ is coupled to the source of transistor $T_3$ and the non-inverting input (+) of amplifier $Amp_2$ receives voltage $V_{reg}$.

Further, regulation circuit 16 comprises a detector DECT receiving voltage $V_g$ and supplying a binary signal $S_{dect}$ in a first state, for example, "1", when voltage $V_g$ is greater than 0 V and supplying binary signal $S_{dect}$ in a second state, for example, "0", when voltage $V_g$ is smaller than or equal to 0 V.

Regulation circuit 16 further comprises a comparator COMP which supplies a signal $S_{comp}$, for example, a binary signal, and having its input coupled to the drain of transistor $T_3$ and receiving a current $I_{comp}$. According to an embodiment, comparator COMP is capable of supplying signal $S_{comp}$ at state "0" when current $I_{comp}$ is positive and of supplying signal $S_{comp}$ at state "1" when current $I_{comp}$ is negative or zero.

Further, regulation circuit 16 comprises a control unit 30 which supplies a signal $I_{test,sel}$ for controlling active load IC, a signal $S_{max,test}$ for controlling switch $SW_1$, and a signal $S_{load,test}$ for controlling switch $SW_2$. Control unit 30 receives signals $S_{dect}$ and $S_{comp}$ and binary signals test_$P_{load}$ and test_$P_{in}$. Control unit 30 further outputs a signal $P_{load}$ representative of the power consumed by application circuit 18 and a signal $P_{in,max}$ representative of the maximum power supplied by energy source 12. According to an embodiment, control unit 30 comprises a finite automaton 32 (FSM $P_{load}$) which receives signals $S_{comp}$ and test_$P_{load}$ and outputs signal $P_{load}$. Finite automaton 32 is, further, coupled to active load IC by a switch $SW_3$. Control unit 30 further comprises a finite automaton 34 (FSM $P_{in}$) which receives signals $S_{dect}$ and test_$P_{in}$ and outputs signal $P_{in,max}$. Finite automaton 34 is, further, coupled to active load IC by a switch $SW_4$.

Figure 4:
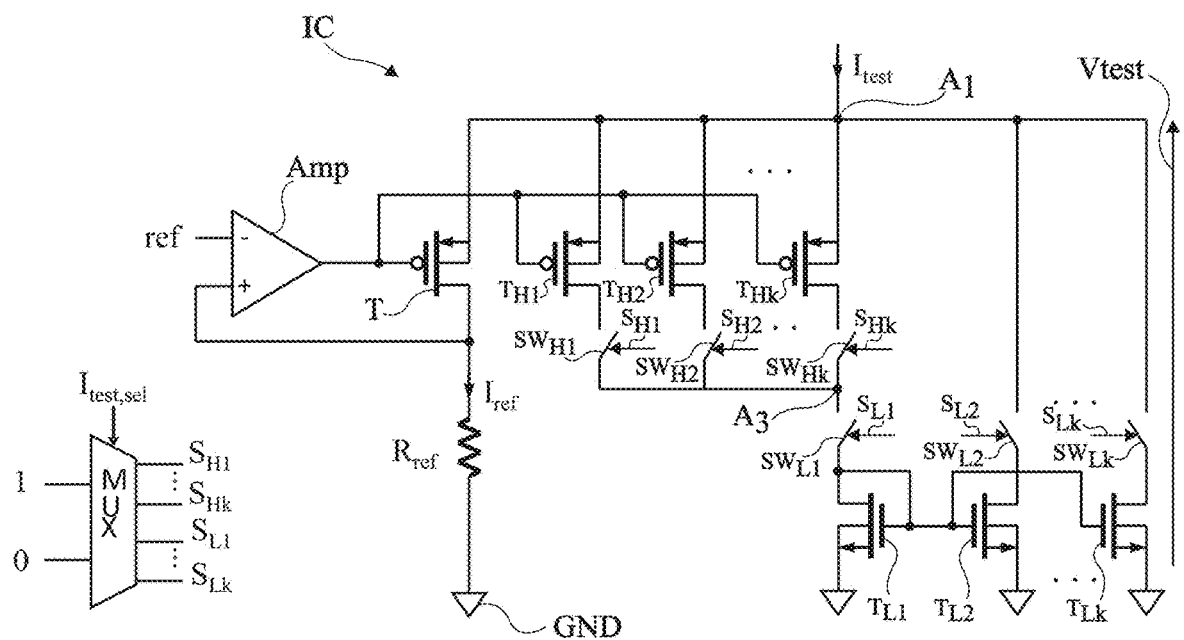
FIG. 4 shows in more detailed fashion an embodiment of elements of the transmission circuit of FIG. 3.

FIG. 4 shows an embodiment of active load IC. Active load IC comprises a MOS transistor T, for example, with a P channel, having its source coupled to node $A_1$ and having its drain coupled to a terminal of a resistor $R_{ref}$, the other terminal of resistor $R_{ref}$ being coupled to the source of low reference potential GND. Resistor $R_{ref}$ conducts a current $I_{ref}$. Active load IC further comprises a differential amplifier Amp having its non-inverting input (+) coupled to the drain of transistor T and having its inverting input (−) receiving a reference voltage ref. The output of amplifier Amp controls the gate of transistor T. Active load IC further comprises k MOS transistors $T_{Hi}$, for example, with a P channel, i varying from 1 to k and k being an integer which may vary from 1 to 100. The source of each transistor $T_{Hi}$ is coupled to node $A_1$ and the drain of each transistor $T_{Hi}$ is coupled to a node $A_3$ via a switch $SW_{Hi}$ controlled by a signal $S_{Hi}$. The transistor gates are coupled to the gate of transistor T. Active load IC further comprises k MOS transistors $T_{Lj}$, for example, having a P channel, with j varying from 1 to k. The source of transistor $T_{L1}$ is coupled to the gate of transistor $T_{L1}$ and is coupled to node $A_3$ via a switch $SW_{L1}$ controlled by a signal Su. The source of each transistor $T_{Hi}$, with j varying from 1 to k, is coupled to node $A_1$ via a switch $SW_{Lj}$ controlled by a signal $S_{Lj}$. The drain of each transistor $T_{Lj}$ is coupled to the source of low reference potential GND. Active load IC further comprises a multiplexer MUX controlled by signal $I_{test,sel}$, receiving an input at "1" and an input at "0" and outputting signals $S_{H1}$ to $S_{Hk}$ and Su to $S_{Lk}$. The "0" or "1" state of each signal $S_{H1}$ to $S_{Hk}$ and Su to $S_{Lk}$ depends on signal $I_{test,sel}$.

During an operation of measurement of the maximum available input power $P_{in,max}$, unit 30 controls active load IC to progressively increase current $I_{test}$ up to a maximum current $I_{in,max}$. Maximum current $I_{in,max}$ is the current which should be drawn by active load IC in order to lower output voltage $V_{eh}$ of energy source 12 down to power supply voltage $V_{reg}$. Power $P_{in,max}$ is then equal to $I_{in,max}*V_{reg}$. The measurement of the power $P_{load}$ consumed by application circuit 18 is performed by measuring the copy of current $I_{load,test}$. Power $P_{load}$ is then equal to Coeff*$I_{load,test}*V_{reg}$.

Active load IC forms a current sink capable of drawing current $I_{test}$ of increasing intensity from transmission line $L_{IN}$. Even though FIG. 4 shows a specific embodiment of current sink IC, those skilled in the art may devise other embodiments of current sink IC. In particular, any circuit enabling to sample a current of controllable intensity from transmission line $L_{IN}$ may be used. A circuit comprising a variable resistor in series with a circuit for regulating the voltage across the resistor (for example, a MOS transistor controlled by a comparison circuit receiving as an input the potential of the source of the transistor coupled to the resistor) may for example be used.

According to an embodiment, the measurement of the maximum available input power $P_{in,max}$ and the measurement of the power $P_{load}$ consumed by application circuit 18 are not performed simultaneously. As an example, signal test_$P_{in}$ is at "1" when an operation of measurement of the maximum available input power $P_{in,max}$ is to be performed and is at "0" in the opposite case and signal test_$P_{load}$ is at "1" when an operation of measurement of the power $P_{load}$ consumed by application circuit 18 is to be performed and is at "0" in the opposite case.

Figure 5:
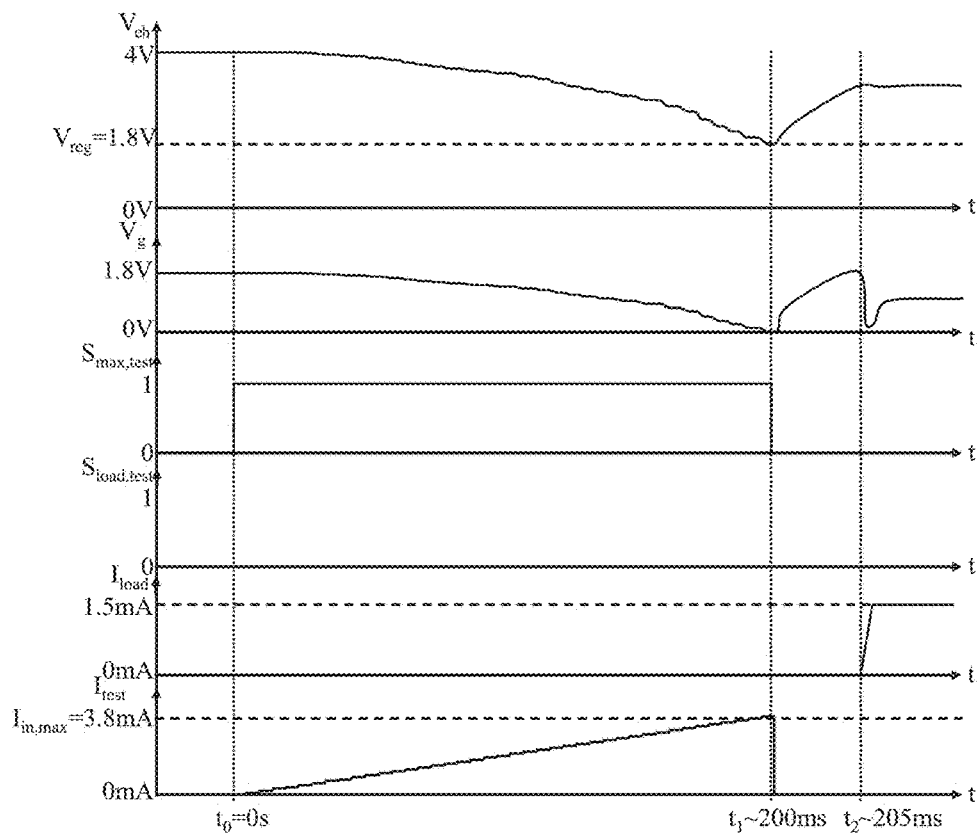
FIGS. 5 and 6 are timing diagrams of signals of the transmission circuit of FIG. 3 in two operating phases.
Figure 6:
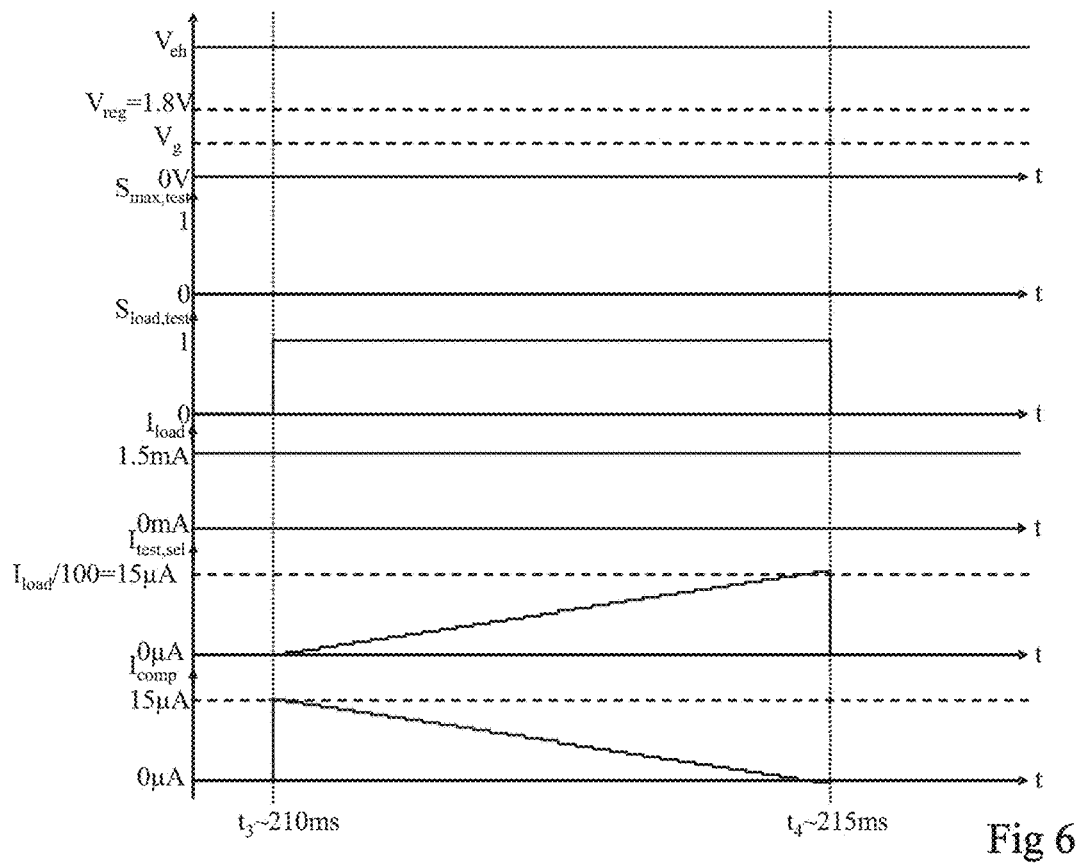

FIGS. 5 and 6 show timing diagrams of voltages and of currents of regulation circuit 16 respectively during a measurement of the maximum available input power $P_{in,max}$ and during a measurement of the power $P_{load}$ consumed by application circuit 18. The numerical values indicated in the drawings are given as an example. Times $t_0$, $t_1$, $t_2$, $t_3$, and $t_4$ are successive times.

A request to measure the maximum available input power $P_{in,max}$ is transmitted by signal test_$P_{in}$, not shown in FIG. 5, which is, for example, set to "1". Switch $SW_1$ is turned on at time $t_0$ by the setting to "1" of signal $S_{max,test}$. Switch $SW_2$ is turned off during the measurement of the maximum available input power $P_{in,max}$, which corresponds to signal $S_{load,test}$ at "0". Node $A_2$ is then connected to active load IC. In the example shown in FIG. 5, current $I_{test}$ increases from time $t_0$ in current steps, for example, approximately 100 µA. Since the output impedance of energy source 12 or of power conversion circuit 14 is finite, voltage $V_{eh}$ decreases as current $I_{test}$ increases. This causes a decrease in voltage $V_g$ in the case where transistor $T_1$ of regulation unit 22 is a P-channel MOS transistor. When voltage $V_{eh}$ reaches voltage threshold $V_{reg}$ at time $t_1$, gate voltage $V_g$ is equal to 0 V. The passing of voltage $V_g$ to 0 V is detected by detector DECT and active load IC is disconnected from node $A_2$ by the turning off of switch $SW_1$ (signal $S_{max,test}$ at "0").

If the available input power $P_{in}$ is such that voltage $V_{eh}$ does not decrease to voltage $V_{reg}$, then switch $SW_1$ is turned off when current $I_{test}$ reaches the maximum value $I_{test\ max}$ capable of being drawn by active load IC. The penultimate value of current $I_{test}$ reached at the time when switch $SW_1$ is turned off is the maximum current $I_{in,max}$ capable of being drawn by active load IC under power supply voltage $V_{reg}$ of the system. The maximum available input power $P_{in,max}$ then is $P_{in,max}=I_{in,max}*V_{reg}$. Value $P_{in,max}$ may be stored and/or communicated to an outer circuit. In the given example, the duration of a measurement of current $I_{in,max}$ is the duration between times $t_0$ and $t_1$, for example, approximately 200 ms. According to another embodiment, current $I_{test}$ increases exponentially during a measurement operation. According to another embodiment, current $I_{test}$ increases by dichotomy during a measurement operation.

According to an embodiment, the measurement of the maximum available power $P_{in,max}$ is performed "off-load", that is, when application circuit 18 is off, which corresponds to current $I_{load}$ equal to 0 A between times $t_0$ and $t_2$.

The measurement of the maximum available power $P_{in,max}$ directly provides information relative to the environment of electronic or electromechanical system 10, which may be unknown. It is for example possible, based on the value of maximum available power $P_{in,max}$, to access the information relative to wind speed if energy source 12 is a wind turbine, to temperature if energy source 12 is a thermal element, to sunlighting if energy source 12 is a photovoltaic cell, or to the quality of the radio frequency link if system 10 is remotely supplied.

In combination with the measurement of the power $P_{load}$ consumed by application circuit 18, which will be described in further detail hereafter, the measurement of power $P_{in,max}$ enables to ensure the proper operation of application circuit 18 and to optimize the use of the power available at the output of energy source 12.

The consumed power $P_{load}$ of application circuit 18 powered under regulated voltage $V_{reg}$ is capable of varying with time, temperature, or any other parameter. Power $P_{load}$ may thus not be known offhand.

The measurement of power $P_{load}$ is performed when application circuit 18 is running. In FIG. 5, application circuit 18 starts at time $t_2$.

A request for a measurement of power $P_{load}$ is transmitted by signal test_$P_{load}$, not shown in FIG. 6, which is, for example, set to "1". Switch $SW_2$ is turned on at time $t_3$ by the setting to "1" of signal $S_{load,test}$. Switch $SW_1$ is off during the measurement of power $P_{load}$, which corresponds to signal $S_{max,test}$ at "0". The current $I_{load}$ which powers application circuit 18 is copied by a current mirror which outputs current $I_{load,test}$ equal to current $I_{load}$ divided by factor Coeff, for example, equal to 100. Current $I_{load,test}$ is equal to the sum of the current $I_{test}$ which flows through active load IC and of the current $I_{comp}$ which flows through current comparator COMP. In the example shown in FIG. 6, current $I_{test}$ increases in current steps, for example, of approximately 500 nA from time $t_3$ and this, until current $I_{comp}$ changes direction and becomes negative. Such an inversion is detected by comparator COMP, which for example outputs a signal $S_{comp}$ at "1". Active current load IC is then disconnected by the turning off of switch $SW_2$ at time $t_4$ by the setting to "0" of signal $S_{load,test}$. The value of current $I_{load}$ is the last value of current $I_{test}$ which precedes the inversion of current $I_{comp}$ multiplied by ratio Coeff. One finally obtains $P_{load}=\text{Coeff}*I_{load,test}*V_{reg}$. In the example illustrated in FIG. 6, the duration of the measurement of current $I_{load}$ is the time period between times $t_3$ and $t_4$ and is approximately 5 ms. According to another embodiment, current $I_{test}$ increases exponentially during a measurement operation. According to another embodiment, current $I_{test}$ increases by dichotomy during a measurement operation.

Value $P_{load}$ may be stored and/or communicated to an external circuit. The variation of power $P_{load}$ can thus be tracked and the last determined value of power $P_{load}$ may be used as a new reference at the next powering on of application circuit 18.

According to another embodiment, an approximate value of power $P_{load}$ can be determined by performing a measurement of the available power $P_{in,max}$ while application circuit 18 is running. The difference between the "off-load" value of $P_{in,max}$, that is, the value when the application circuit is not running, and the value of $P_{in,max}$ on load is an approximation of power $P_{load}$. This embodiment of the measurement of power $P_{load}$ is independent from the structure of voltage regulation unit 22. However, this embodiment of the determination of an approximation of power $P_{load}$ is less accurate than the previously-described embodiment of measurement of power $P_{load}$.

Figure 7:
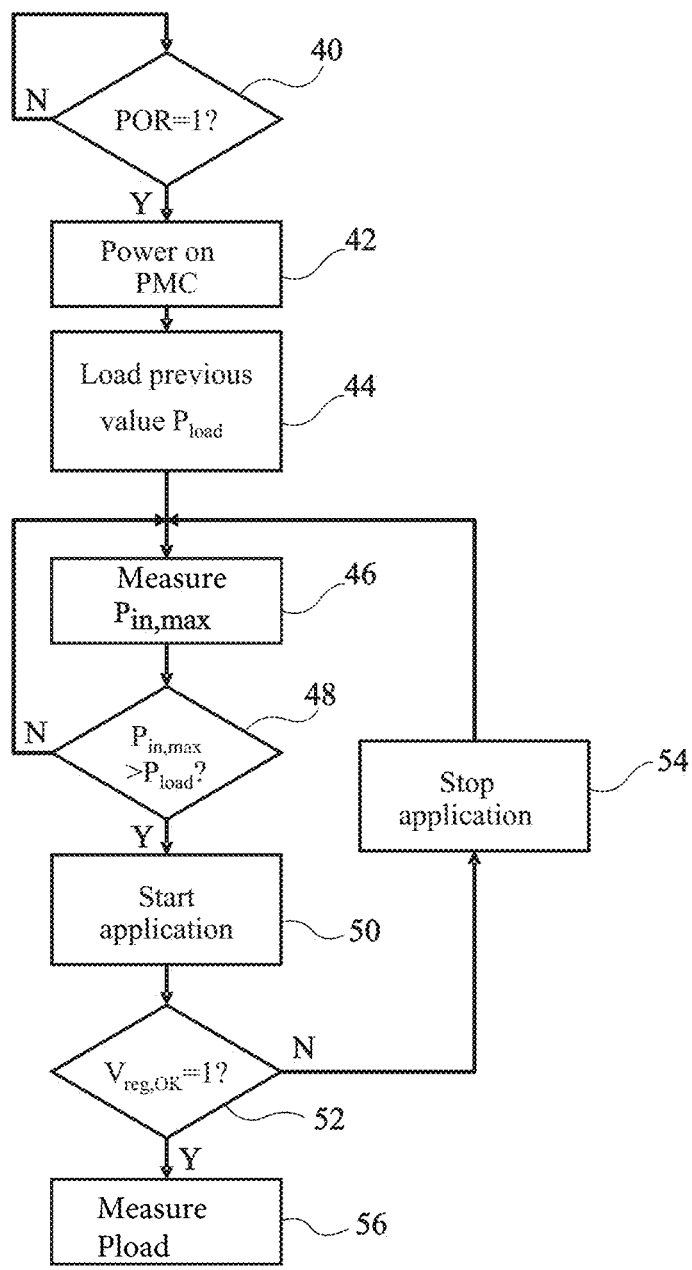
FIGS. 7 and 8 are state and transition diagrams of two embodiments of an operating mode of the transmission circuit of FIG. 3.

FIG. 7 shows a state and transition diagram of an embodiment of an operating mode of transmission circuit 16 such as shown in FIG. 2, where application circuit 18 operates according to a single operating mode and implementing a regulation method using the values of powers $P_{in,max}$ and $P_{load}$. In the present embodiment, powers $P_{in,max}$ and $P_{load}$ are measured at the powering on of application circuit 18.

At step 40, power-on control unit 30 starts, for example, when voltage $V_{eh}$ exceeds a threshold. When it has started, power-on control unit 30 outputs a signal POR at "1". The method then proceeds to step 42.

At step 42, control unit 30 controls the powering on of power management unit 28. The method then proceeds to step 44.

At step 44, power management unit 28 loads the last determined value of power $P_{load}$, which is for example stored in a memory, and which is used as a reference power value. The method then proceeds to step 46.

At step 46, unit 24 determines maximum power $P_{in,max}$, as for example previously described, and supplies the value of maximum power $P_{in,max}$ thus determined to power management unit 28. The method then proceeds to step 48.

At step 48, power management unit 28 compares maximum power $P_{in,max}$ with the reference value of power $P_{load}$. If maximum power $P_{in,max}$ is smaller than reference power $P_{load}$, the method returns to step 46. If maximum power $P_{in,max}$ is greater than the reference value of power $P_{load}$, the method proceeds to step 50.

At step 50, power management unit 28 controls the powering on of application circuit 18. The method proceeds to step 52.

At step 52, during the operation of application circuit 18, unit 26 monitoring voltage $V_{reg}$ supplies binary signal $V_{reg,OK}$ to power management unit 28. If signal $V_{reg,OK}$ is in a state, for example, "0", which indicates that voltage $V_{reg}$ is not at a level sufficient for the proper operation of application circuit 18, the method proceeds to step 54. If signal $V_{reg,OK}$ is in a state, for example, "1", which indicates that voltage $V_{reg}$ is at a level sufficient for the proper operation of application circuit 18, the method proceeds to step 56.

At step 54, application circuit 18 is stopped and the method proceeds to step 46.

At step 56, unit 24 determines power $P_{load}$, as previously described, and supplies the value of power $P_{load}$ thus determined to power management unit 28. This value is used as a new the reference value of power $P_{load}$.

Figure 8:
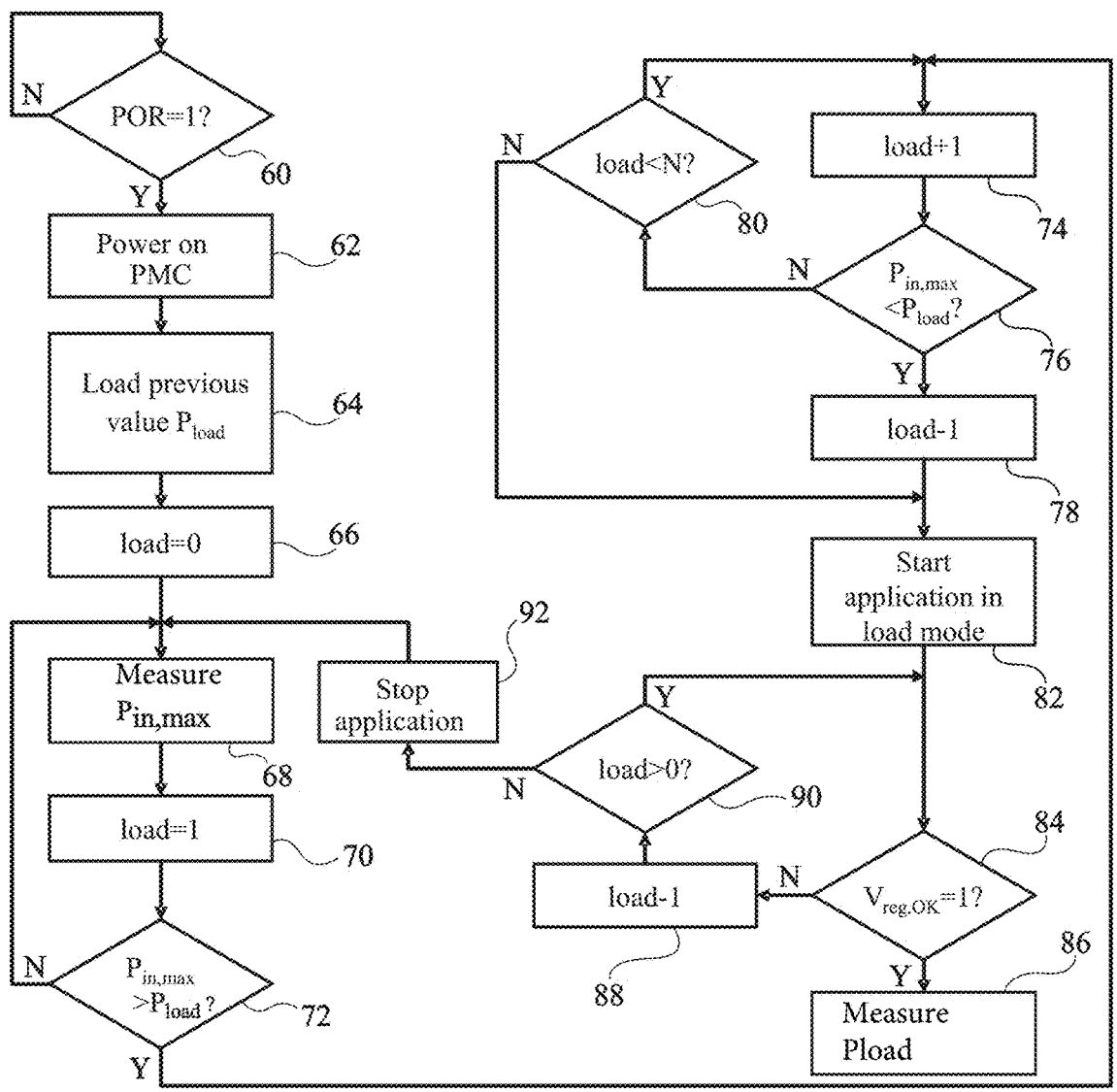

FIG. 8 shows the state and transition diagram of transmission circuit 16 such as shown in FIG. 2, implementing a regulation method using the values of powers $P_{in,max}$ and $P_{load}$ and where application circuit 18 can operate according to N operating modes, including an off-load operating mode, N being an integer in the range from 2 to 10. In the present embodiment, powers $P_{in,max}$ and $P_{load}$ are measured at the powering on of application circuit 18. In the present embodiment, the operating mode in which application circuit 18 is operating is controlled by signal Load_control supplied by power management unit 28. As an example, when signal Load_control is equal to 0, application circuit 18 is off and when signal Load_control varies from 1 to N, application circuit 18 is powered and consumes an average power $P_{load}$ under a regulated voltage $V_{reg}$ which increases along with signal Load_control.

At step 60, power-on control unit 30 starts. When it has started, power-on control unit 30 outputs a signal POR at "1". The method then proceeds to step 62.

At step 62, unit 30 controls the powering on of power management unit 28. The method then proceeds to step 64.

At step 64, power management unit 28 loads the last determined power values $P_{load}$ for the different operating modes of application circuit 18. These values are for example stored in a memory. They are used as reference power values afterwards. The method then proceeds to step 66.

At step 66, power management unit 28 controls the maintaining in the off state of application circuit 18. The method then proceeds to step 68.

At step 68, unit 24 determines maximum power $P_{in,max}$, as previously described, and supplies the value of maximum power $P_{in,max}$ thus determined to power management unit 28. The method then proceeds to step 70.

At step 70, power management unit 28 increments the value to be applied to signal Load_control without however transmitting it to application circuit 18. The method then proceeds to step 72.

At step 72, power management unit 28 compares maximum power $P_{in,max}$ with the last reference value of power $P_{load}$ corresponding to signal Load_control equal to 1. If maximum power $P_{in,max}$ is smaller than the last reference value of power $P_{load}$, the method returns to step 68. If maximum power $P_{in,max}$ is greater than the last reference value of power $P_{load}$, the method proceeds to step 74.

At step 74, power management unit 28 increments the value to be applied to signal Load_control without however transmitting it to application circuit 18. The method then proceeds to step 76.

At step 76, power management unit 28 compares maximum power $P_{in,max}$ with the last reference value of power $P_{load}$ corresponding to the value of signal Load_control determined at step 74. If maximum power $P_{in,max}$ is smaller than the last reference value of power $P_{load}$, the method returns to step 78. If maximum power $P_{in,max}$ is greater than the last reference value of power $P_{load}$, the method proceeds to step 80.

At step 78, power management unit 28 decrements the value to be applied to signal Load_control without however transmitting it to application circuit 18. The method then proceeds to step 82.

At step 80, power management unit 28 compares the value of signal Load_control determined at step 74 with value N. If the value of signal Load_control is smaller than N, the method returns to step 74. If the value of signal Load_control is equal to N, the method proceeds to step 82.

At step 82, power management unit 28 controls the powering on of application circuit 18 with the last value of signal Load_control determined at step 76. The method proceeds to step 84.

At step 84, during the operation of application circuit 18, unit 26 for monitoring voltage $V_{reg}$ supplies binary signal $V_{reg,OK}$ to power management unit 28. If signal $V_{reg,OK}$ is in a state, for example, "1", which indicates that voltage $V_{reg}$ is at a level sufficient for the proper operation of application circuit 18, the method proceeds to step 86. If signal $V_{reg,OK}$ is in a state, for example, "0", which indicates that voltage $V_{reg}$ is not at a level sufficient for the proper operation of application circuit 18, the method proceeds to step 88.

At step 86, unit 24 determines power $P_{load}$, as previously described, and supplies the value of power $P_{load}$ thus determined to power management unit 28.

At step 88, power management unit 28 decrements the value of signal Load_control and transmits it to application circuit 18. The method then proceeds to step 90.

At step 90, power management unit 28 compares the value of signal Load_control determined at step 88 with 0. If the value of signal Load_control is greater than 0, the method returns to step 84. If the value of signal Load_control is equal to 0, the method proceeds to step 92.

At step 92, application circuit 18 is stopped and the method proceeds to step 68.

Figure 9:
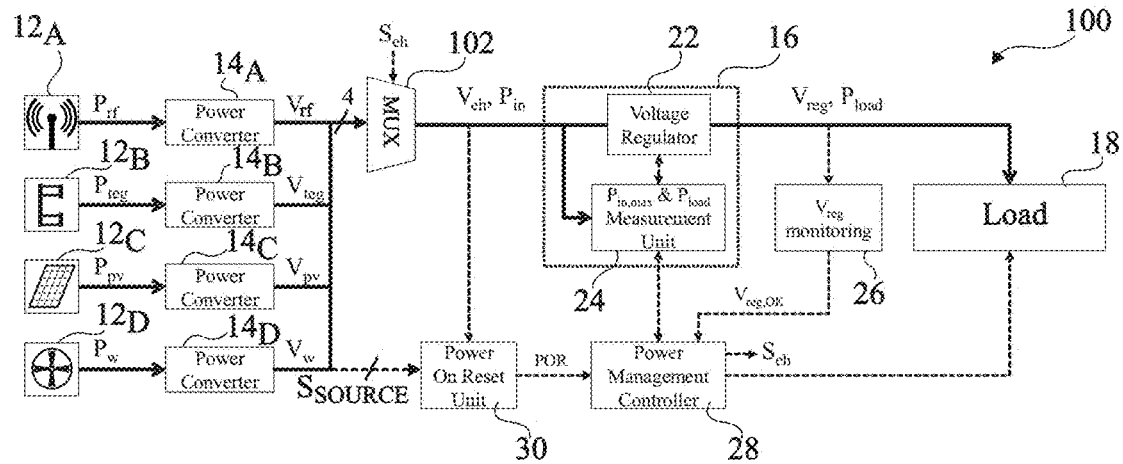
FIG. 9 partially and schematically shows another embodiment of the transmission circuit of the autonomous electronic or electromechanical system.

FIG. 9 shows another embodiment of an electronic or electromechanical system 100 comprising all the elements of electronic or electromechanical system 10 shown in FIG. 2, with the difference that energy source 12 is replaced with a plurality of energy sources $12_A$, $12_B$, $12_C$, and $12_D$, and that power-on control unit 30 receives a signal $S_{source}$. Energy sources $12_A$, $12_B$, $12_C$, and $12_D$ for example correspond to a radio frequency energy collector $12_A$ outputting an electric power $P_{rf}$, to a thermal power collector $12_B$ outputting an electric power $P_{teg}$, to a solar power collector $12_C$ outputting an electric power $P_{pv}$, and to a wind power collector $12_D$ outputting an electric power $P_w$. Energy sources $12_A$, $12_B$, $12_C$, and $12_D$ power respective power conversion circuits $14_A$, $14_B$, $14_C$, and $14_D$ which output electric voltages $V_{rf}$, $V_{teg}$, $V_{pv}$, and $V_w$. As a variation, at least one of power conversion circuits $14_A$, $14_B$, $14_C$, and $14_D$ may be omitted. System 100 further comprises a multiplexer 102 controlled by a signal $S_{eh}$, which enables to select one or a plurality of energy sources $12_A$, $12_B$, $12_C$, and $12_D$. According to an embodiment, the maximum available power $P_{in,max}$ may be measured separately at the output of each energy source or of some of them $12_A$, $12_B$, $12c$, and $12_D$, sequentially. Based on these results, it is then possible to select the energy source which is best adapted for the power supply of application circuit 18. Signal $S_{eh}$ may be representative of the energy source which is selected for the power supply of application circuit 18.

In the embodiment previously described in relation with FIG. 3, active load IC is coupled by switch $SW_1$ to node $A_2$, which is located on transmission line $L_{IN}$ between energy source 12 and power conversion circuit 16. According to another embodiment, active load IC may be coupled by switch $SW_1$ to a node which is located between power conversion circuit 16 and application circuit 18, particularly when power conversion circuit 16 is of low voltage drop type. However, the power $P_{in,max}$ thus measured takes into account the power consumed by power conversion circuit 16.

Specific embodiments have been described. Various alterations and modifications will occur to those skilled in the art. In particular, although in the embodiments previously described with FIG. 3, voltage regulation unit 22 is of low voltage drop type, voltage regulation unit 22 may have a different structure. As an example, voltage regulation unit 22 may correspond to a switched-mode power supply circuit with a regulated output voltage.

The determination of power $P_{in,max}$ may be performed as previously described, with the difference that current $I_{in,max}$ is the current to be drawn by active load IC to lower the output voltage $V_{eh}$ of energy source 12 down to the minimum voltage $V_{eh,min}$ for which voltage regulation circuit 16 is capable of supplying voltage $V_{reg}$, and voltage $V_{eh,min}$ may be different from voltage $V_{reg}$ according to the considered type of regulation circuit 16. The determination of power $P_{load}$ may be performed as previously described, with the difference that current $I_{load,test}$ is preferably drawn from transmission line $L_{OUT}$.

Figure 10:
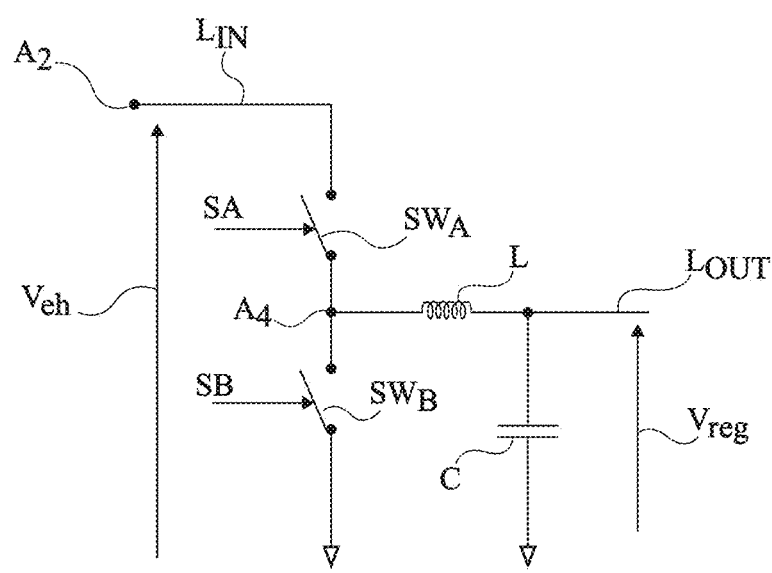
FIG. 10 shows another embodiment of the voltage regulation unit of the electronic or electromechanical system.

FIG. 10 shows another embodiment of voltage regulation unit 22 of switched-mode type. Voltage regulation unit 22 comprises a first switch $SW_A$, for example, an N-channel MOS transistor, controlled by a signal SA and coupling node $A_2$ to a node $A_4$. Voltage regulation unit 22 further comprises a second switch $SW_B$, for example, an N-channel MOS transistor, controlled by a signal SB and coupling node $A_4$ to a source of low reference potential GND. Voltage regulation unit 22 further comprises an inductance L coupling node $A_4$ to transmission line $L_{OUT}$ and a capacitor C coupling transmission line $L_{OUT}$ to a source of low reference potential GND.

Switches $SW_A$ and $SW_B$ are controlled in complementary fashion so that when one of switches $SW_A$ or $SW_B$ is off, the other switch is on. Signal SA may be a pulse-width modulated binary signal, the ratio of voltages $V_{reg}$ and $V_{eh}$ depending on the duty cycle of signal SA and being, for example, proportional to the duty cycle of signal SA.

The invention claimed is:

1. An electronic or electromechanical system comprising at least one electrical energy source, an application circuit capable of operating in at least two operating modes, one of which corresponds to the stopping of the application circuit, and a transmission circuit for transmitting electrical energy from the at least one electrical energy source to the application circuit, the transmission circuit being further capable of determining a first value of a maximum instantaneous electric power capable of being supplied by the at least one electrical energy source, of determining a second value of an instantaneous electric power consumed by the application circuit in at least one of the operating modes, and of storing the first and second values or of selecting one of the at least two operating modes for the application circuit to operate based on the first and second values, wherein the transmission circuit comprises a voltage regulation circuit capable of receiving a first voltage supplied by the at least one electrical energy source, or by a power conversion circuit interposed between the energy source and the transmission circuit, and capable of supplying a second voltage regulated at a reference voltage powering the application circuit, wherein the energy source is coupled to the transmission circuit by a first transmission line, wherein the transmission circuit is coupled to the application circuit by a second transmission line, wherein the transmission circuit comprises a current sink circuit capable of drawing a first current of increasing intensity from the first transmission line and wherein the transmission circuit comprises a circuit of determination of the maximum intensity of the first current for which the second voltage is no longer regulated.

2. The system of claim 1, wherein the voltage regulation circuit is a voltage regulator having a low voltage drop.

3. The system of claim 1, wherein the application circuit is capable of operating according to a succession of operating modes, an electric power consumption of the application circuit in one of the operating modes of said succession being greater than the electric power consumption of the application circuit in the next operating mode of said succession, the transmission circuit being further capable of controlling the operation of the application circuit in the previous operating mode in said succession when the first value is smaller than the second value.

4. The system of claim 1, wherein the transmission circuit is capable of determining the first value as being the product of the reference voltage by the maximum intensity.

5. The system of claim 1, wherein the application circuit is capable of receiving a second current and wherein the transmission circuit comprises a copying circuit capable of supplying a third current equal to the second current multiplied by a copying factor.

6. The system of claim 5, wherein the transmission circuit comprises a circuit capable of supplying a fourth current equal to the difference between the third current and the first current and a circuit of detection of an inversion of a direction of the fourth current.

7. The system of claim 6, wherein the transmission circuit is capable of determining the second value as being the product of the copying factor, of the reference voltage, and of the intensity of the first current for which the direction of the fourth current is inverted.

8. The system of claim 1, wherein the electrical energy source is a device of conversion into electrical energy of energy selected from the group comprising thermal energy, vibratory energy, solar energy, wind energy, and radio frequency energy.

9. The system of claim 1, comprising no energy storage device having a capacitance greater than 100 µF.

* * * * *